United States Patent

Olsen et al.

[11] Patent Number: 5,992,574
[45] Date of Patent: Nov. 30, 1999

[54] METHOD AND APPARATUS TO INSPECT HOISTING ROPES

[75] Inventors: Eric G. Olsen, Southbury, Conn.; Hugh J. O'Donnell, Longmeadow, Mass.

[73] Assignee: Otis Elevator Company, Farmington, Conn.

[21] Appl. No.: 08/781,944

[22] Filed: Dec. 20, 1996

[51] Int. Cl.$^6$ .................................................. B66B 9/00
[52] U.S. Cl. .......................... 187/391; 187/393; 187/414; 73/158
[58] Field of Search ............................... 73/158; 324/206, 324/207.24; 57/216, 220; 33/708, 732, 735, 763, DIG. 1; 187/391, 393, 414, 250

[56] References Cited

U.S. PATENT DOCUMENTS

| | | |
|---|---|---|
| 951,147 | 3/1910 | Porter . |
| 1,274,401 | 8/1918 | Everett . |
| 1,282,390 | 10/1918 | Dodge . |
| 1,635,739 | 7/1927 | Brewster . |
| 1,635,750 | 7/1927 | Jenks . |
| 1,807,131 | 5/1931 | Palmer . |
| 1,885,821 | 11/1932 | Green . |
| 2,705,735 | 4/1955 | Wolf . |
| 2,989,690 | 6/1961 | Cook ........................................ 324/206 |
| 3,264,629 | 8/1966 | Bus, Sr. .................................. 324/206 |
| 4,022,010 | 5/1977 | Gladenbeck et al. ...................... 57/149 |
| 4,106,005 | 8/1978 | Asakawa ................................. 324/206 |
| 4,158,283 | 6/1979 | Nation ...................................... 57/200 |
| 4,338,565 | 7/1982 | Hall ........................................ 324/206 |
| 4,350,046 | 9/1982 | Parfee et al. ............................... 73/768 |
| 4,400,890 | 8/1983 | Ohkubo et al. ............................ 33/708 |
| 4,409,852 | 10/1983 | Suzuki et al. ............................ 324/206 |
| 4,452,168 | 6/1984 | Gause ..................................... 116/200 |
| 4,498,282 | 2/1985 | Graetz ...................................... 57/218 |
| 4,624,097 | 11/1986 | Wilcox ..................................... 57/232 |
| 4,718,168 | 1/1988 | Kerr ........................................ 324/206 |
| 4,756,188 | 7/1988 | Fennell ..................................... 33/763 |
| 4,782,196 | 11/1988 | Ukai ......................................... 57/216 |
| 4,887,422 | 12/1989 | Klees et al. ............................... 57/220 |
| 4,936,136 | 6/1990 | Vanhala .................................... 73/158 |
| 5,291,131 | 3/1994 | Suzuki et al. ............................ 324/206 |
| 5,526,552 | 6/1996 | De Angelis ............................. 24/136 L |
| 5,566,786 | 10/1996 | De Angelis et al. .................... 187/266 |

FOREIGN PATENT DOCUMENTS

| | | |
|---|---|---|
| 2169431 | 9/1996 | Canada . |
| 0731209 | 9/1996 | European Pat. Off. . |
| 1059373 | 3/1954 | France . |
| 2442393 | 3/1975 | Germany . |
| 54-140984 | 11/1979 | Japan . |
| 65-1056906 | 3/1986 | Japan . |
| 5248495 | 9/1993 | Japan . |
| 08225270 | 9/1996 | Japan . |
| 08225271 | 9/1996 | Japan . |
| 1142752 | 2/1969 | United Kingdom . |

*Primary Examiner*—Christopher P. Ellis
*Assistant Examiner*—Douglas Hess

[57] ABSTRACT

A hoisting rope includes a plurality of longitudinally spaced, discrete targets retained within the rope. The targets have a characteristic that may be monitored by a device that is responsive to that characteristic. In a particular embodiment, the targets are formed from a magnetically permeable material and the monitoring device responds to changes in the magnetic field as the target passes the monitoring device. In another embodiment, the targets are formed from material that reflects electromagnetic energy. In this embodiment, the monitoring device emits electromagnetic energy and is sensitive to the energy that is reflected back from the target. A method to inspect the hoisting ropes includes the steps of positioning the monitoring device proximate to the hoisting rope, moving the hoisting rope relative to the device, and monitoring the targets to determine the spacing between targets. Changes in spacing are indicative of stretching of the rope, and thereby degradation of the rope.

12 Claims, 3 Drawing Sheets

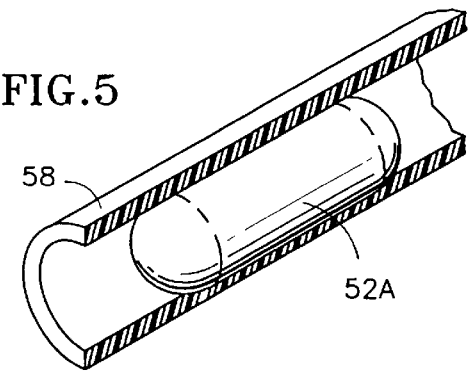
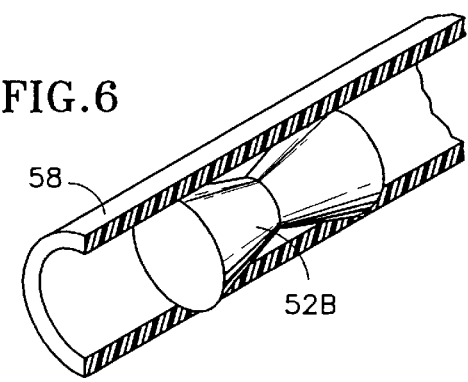
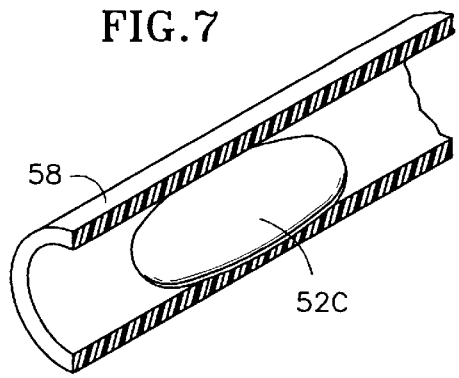
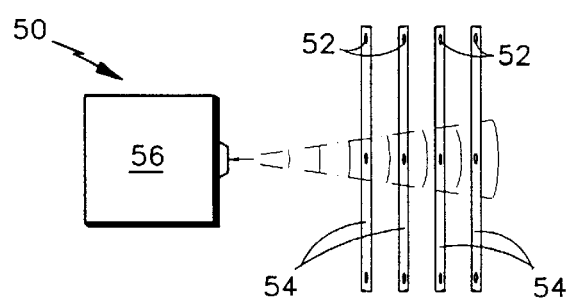

METHOD AND APPARATUS TO INSPECT HOISTING ROPES

TECHNICAL FIELD

The present invention relates to roped elevator systems, and more particularly to a method and apparatus to inspect the hoisting ropes of such systems.

BACKGROUND OF THE INVENTION

Hoisting ropes for elevators are used to provide the necessary lifting forces and traction forces for moving the elevator car. Hoisting ropes are typically formed from steel wire strands woven together to form the rope. Such hoisting ropes have proven to be very durable and dependable. A drawback to the use of steel wire ropes is their weight. As the rise of the elevator increases, the portion of the load resulting from the rope weight increases. This produces a limitation on the rise of the elevator and the size of the lifting equipment.

Other high strength materials have been suggested to replace the steel wire ropes. High strength, polyaramid materials, such as KEVLAR, are being investigated for use in elevator applications. These ropes would be formed from polyaramid fibers woven to form strands, which are then woven together to form the rope. An outer jacket may then be used to protect the woven fibers from damage and wear, and to provide the necessary traction to move the elevator car.

An area of concern is how to inspect such synthetic ropes to determine if the rope should be discarded and replaced with a new rope. The current inspection methods for steel wire rope includes visually inspecting the rope to determine the number of broken steel fibers in a given length of steel rope. If a predetermined maximum number of broken fibers is detected, the steel rope is discarded. This method is not applicable to synthetic fiber ropes having an outer jacket.

One previously known method is to place an electrically conductive member within the rope. The status of the conductive member may be tested by applying an electrical current to the member. If damage occurs to an extent great enough to break the conductive member, the electrical circuit is broken. There are several drawbacks to this method. First, there is no assurance that the loss of electrical continuity is the result of damage to the rope. Second, there is no qualitative information to indicate if the rope is degrading during use. The first indication is provided by the broken conductive member. Further, this method provides no information on the location of the damage along the length of the rope.

The above art notwithstanding, scientists and engineers under the direction of Applicants' Assignee are working to develop methods and apparatus to inspect hoisting ropes.

DISCLOSURE OF THE INVENTION

The present invention is predicated in part upon the recognition that as a hoisting rope degrades, the fibers and strands begin to fail. This will cause the remaining fibers and strands to carry less loads, which will lead to elongation of those fibers and strands. Monitoring the elongation of the rope provides an indication of the level of degradation of the rope.

According to the present invention, a hoisting rope includes a plurality of longitudinally spaced, discrete targets retained within the rope. The targets have a characteristic that may be monitored by a device responsive to that characteristic.

According to another aspect of the invention, a method to inspect hoisting ropes includes the steps of positioning the device proximate to the hoisting rope, moving the hoisting rope relative to the device, and monitoring the targets to determine the spacing between targets.

The feature of targets disposed within the rope provides the advantage of being able to monitor the rope without requiring visual inspection or destructive evaluation. The monitoring device senses each target when the target is proximate to the device. The spacing between targets is then monitored for changes. For example, if a particular section of rope begins to degrade, that section may begin to stretch as fewer strands and fibers begin to carry the load. Stretching of this section of the rope will cause the targets in that section to move further apart. When this section of the rope is monitored by the device, the increase in separation between targets will be recognized.

Further advantages of the invention include that the device may be used to periodically inspect the ropes, or the device may be placed in a fixed position near the ropes and used to continually monitor the ropes. The latter embodiment is particularly advantageous for elevator applications, since the monitoring information may be communicated with the controller of the elevator. If significant degradation of the rope is sensed, the operation of the elevator may be stopped. In addition, the output of the monitoring device may be communicated to a remote monitoring system such that maintenance or replacement of the ropes may be conducted prior to significant degradation of the ropes.

In a particular embodiment, the plurality of targets are disposed within an elastic tube, with the targets being spaced apart by spacers disposed between adjacent targets. The elastic tube is not a load-carrying member of the rope and has a modulus of elasticity less than the load-carrying strands of the rope. This permits the tube to stretch in accordance with the amount the rope elongates. The spacers do not have the particular characteristic that is being monitored by the monitoring device and are used to provide a predetermined spacing between adjacent targets.

In one particular configuration, the targets are formed from material having a magnetic permeability. In this configuration, the monitoring device is sensitive to changes in magnetic fields such that it responds to the targets. In another particular configuration, the targets are formed from material that reflects electromagnetic waves. In this configuration, the monitoring device emits electromagnetic energy and is sensitive to the energy that is reflected back to the monitoring device. According further to this configuration, the targets may be shaped to provide reflected energy of a particular frequency in a preselected direction, such as lateral to the longitudinal direction of the rope. This latter embodiment provides means to filter out unwanted noise that may interfere with the operation of the monitoring device and reduces radiated power needed to detect the target.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIGS. 5–7 are views of different shaped targets. FIG. 5a shows a cylindrical shaped target; FIG. 5b shows targets having a hyperbolic conical shape; and FIG. 5c shows targets having an oblate spheroid shape.

FIG. 8 is an illustration of an alternate embodiment having a single monitoring device to monitor a plurality of ropes.

BEST MODE FOR CARRYING OUT THE INVENTION

Figure 1:
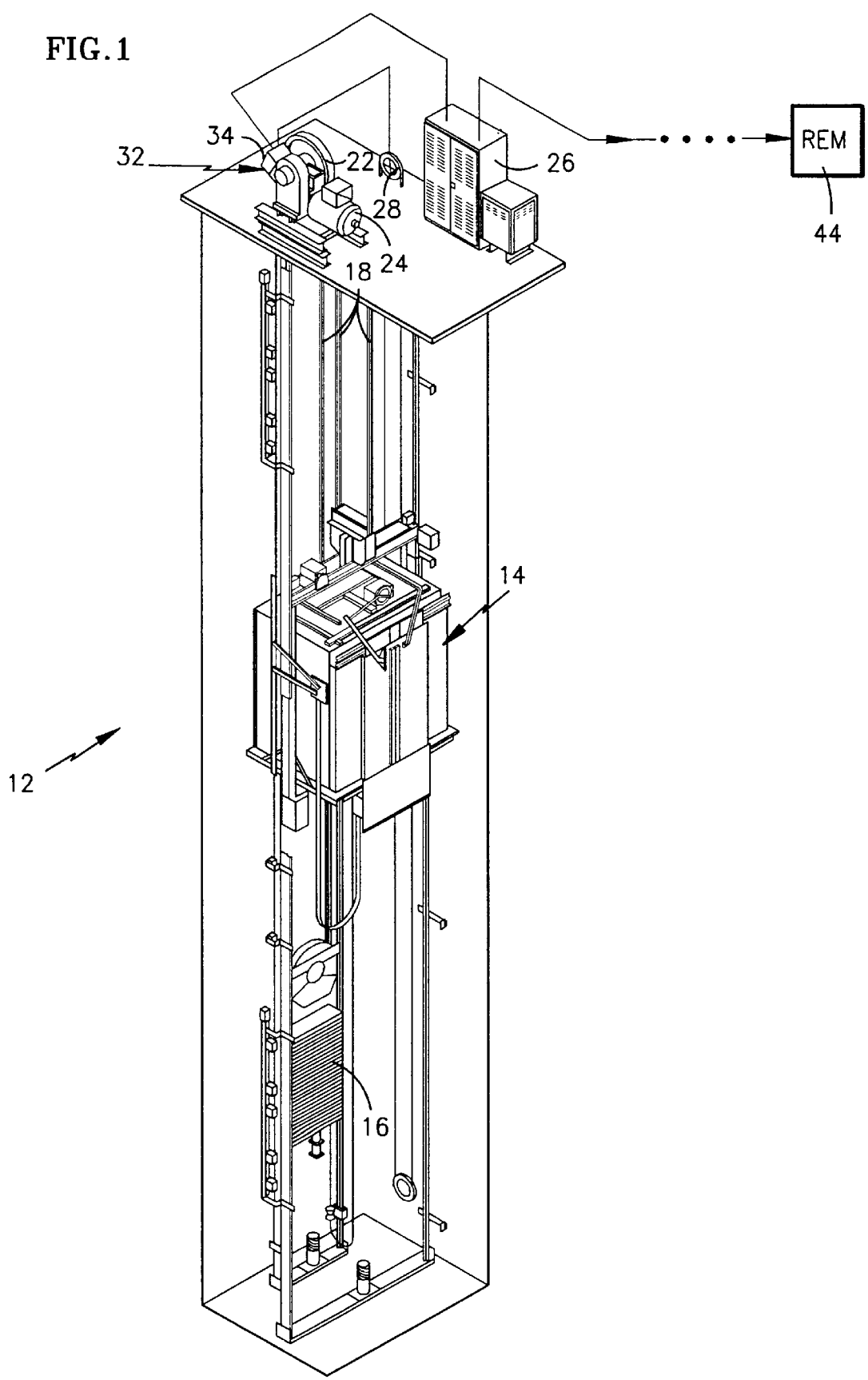
FIG. 1 is an illustration of an elevator system.

Illustrated in FIG. 1 is an elevator system 12 having a car 14 connected to a counterweight 16 by a plurality of ropes 18. The ropes 18 extend over a traction sheave 22 that is driven by a machine 24. Traction between the sheave 22 and the ropes 18 drives the car 14 and counterweight 16 through the hoistway. Operation of the machine 24 is controlled by a controller 26. The controller 26 receives inputs from a position sensing device 28 to determine the speed and position of the car 14.

Also illustrated in FIG. 1 is a rope monitoring system 32. The rope monitoring system 32 includes a monitoring device 34 disposed in a location proximate to the ropes 18. The monitoring device 34 senses the presence of targets 36 (see FIG. 2–4) disposed within the ropes 18. In the embodiment shown, the monitoring device 34 is an inductive sensor that responds to changes in the magnetic field within the field of response of the device 34. As shown in FIG. 1, the monitoring device 34 produces an output that is communicated to the controller 26.

Figure 2:
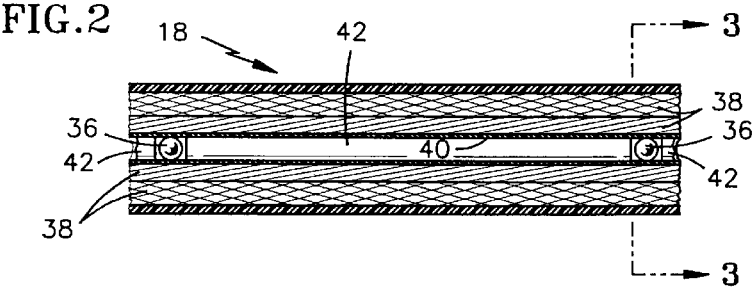
FIG. 2 is a sectional side view of a length of a single rope having a plurality of targets embedded therein.
Figure 3:
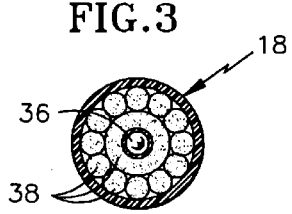
FIG. 3 is a sectional view taken along line 3—3 of FIG. 2.
Figure 4:
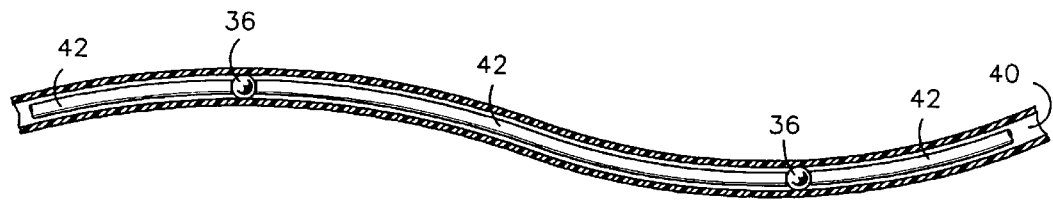
FIG. 4 is a side view of a flexible tube having the targets and spacers.

Referring now to FIGS. 2 and 3, each rope 18 is formed from a plurality of load-carrying strands 38 of a synthetic fiber, such as KEVLAR. Captured within the strands 38 of the rope 18 is a plurality of the targets 36. The targets 36 are spaced longitudinally throughout the rope 18 at a predetermined distance apart. The targets 36 are centrally located within the rope 18 and are retained within a flexible tube 40, as shown in FIG. 4. The tube 40 is not a load-carrying member of the rope 18. A plurality of flexible spacers 42 are placed between adjacent targets 36 to maintain the proper spacing between targets 36 at the time of installation. The necessary spacing between adjacent targets 36 is dependent upon the discrimination of the monitoring device 34 to the targets 36. Once installed, shear forces from the surrounding strands of the ropes 18 will provide further retention of the targets 36.

The targets 36 are formed from a ferrous material such that each target 36 affect the magnetic flux that is generated and detectable by the monitoring device 34. A suggested material for the targets 36 is steel, although other ferrous materials may be equally applicable. Each target 36 is spherically shaped to avoid damage to the surrounding fibers of the strands 38. The tube 40 and the spacers 42 are formed from materials that do not emit magnetic flux and that have a modulus of elasticity less than the strand 38 material and strain-to-failure properties greater than the strand material. In this way, the tube 40 will stretch in accordance with the strands 38 during operation of the elevator system 12 and over the life of the rope 18. The tube 40 and spacers 42 are one example of a means to locate the targets 36 within the rope 18. Other possible means of locating the targets include weaving the targets into the rope during the fabrication of the rope, or weaving a strand formed from alternating ferrous and non-ferrous materials into the strands. In addition, the tube is shown in FIGS. 2 and 3 as being located in the center of the rope. The tube may also be integrated into the rope such that it follows the helix or twist of the stranded rope.

During operation, the controller 26 communicates with the machine 24 to rotate the traction sheave 22 in the desired direction. Traction forces between the sheave and the ropes 18 move the car 14 and counterweight 16 in opposite directions. As the ropes 18 are driven, the plurality of targets 36 move past the monitoring device 34. Each target 36 triggers a change in the magnetic field that is sensed by the monitoring device 34. The monitoring device 34 senses the amount of time between adjacent targets 36. The time between targets 36 is correlated with the speed of the car 12, as determined by the position sensing device 28, to determine the distance between adjacent targets 36. The determined distance between targets 36 is then compared to the known distance between targets 36 at the time of installation. If the rope 18 has elongated in a particular section of the rope 18, which is indicative of degradation of the rope 18, the targets 36 in that section will also have moved further apart. Therefore, the increased distance between targets 36, as compared to the known, installed distance between targets 36, is indicative of degradation of the rope 18. In addition, correlation of the monitoring device 34 output and the output from the position sensing device 28 provides a determination of the location of the damaged section of the rope 18.

The output of the monitoring device 34 is communicated to the controller 26. The controller 26 compares the determined distance between adjacent targets 36 with a predetermined threshold to determine if the degradation of the rope 18 is sufficient such that the elevator system 12 should be shut down. If not sufficient to warrant shutting down the elevator system 12, the controller 26 compares the elongation to another threshold to determine if it is sufficient to warrant an inspection of that particular section of rope 18. In addition, the data generated by the monitoring device 34 may also be communicated out to a remote monitoring system 44 for further analysis and/or to provide the information to a mechanic to use during a maintenance visit to the elevator system 12. During a maintenance visit, the mechanic can use the information to conduct a visual inspection of the degraded portion of the rope 18, such as measuring the diameter of the rope 18 or looking for visual signs of damage.

Although shown and described as a monitoring system for continuously monitoring the health of the ropes, the invention is equally applicable as a method to periodically inspect the health of the ropes. In this configuration, a mechanic would install a monitoring device during a routine maintenance visit. As the elevator system is cycled through the hoistway, the distance between adjacent targets is determined. The information on elongation is then compared to the predetermined baseline distance between targets, and to previous information generated during previous maintenance visits, to determine if any significant degradation has occurred.

The monitoring system 32 described above, which uses changing magnetic fields to determine position of the targets 36, is one embodiment of the invention. Another embodiment is illustrated in FIG. 8. In this embodiment, the monitoring system 50 includes targets 52 formed from discrete conductive members spaced longitudinally throughout the ropes 54 and a monitoring device 56 that generates high frequency (2 gHz to 40 gHz) radar directed at the plurality of ropes 54. The targets 52, as they pass the monitoring device 56, reflect the electromagnetic waves in a narrow beam that extends laterally from the rope 54 and is received by the monitoring device 56. The targets 52 may be relatively long (5–200 cm) and thin (0.05–1 mm) and shaped in a cylindrical manner (52a) as shown in FIG. 5. As an alternative, the targets 52 may have various other shapes, such as a hyperbolic conical shape (see 52b in FIG. 6) or a oblate spheroid shape (see 52c FIG. 7). Targets of various shapes will provide different response patterns that may be more advantageous depending on the operating conditions and the sensitivity of the monitoring device 56.

The targets 52 are retained within a thin wall elastic tube 58 formed from a non-reflecting material at the frequencies being generated by the monitoring device 56. As with the embodiment of FIGS. 1–4, the tube 58 has a modulus of elasticity less than the strands of the rope 54 such that it freely stretches as the strands elongate.

The monitoring device 56 is a multiple impulse radar that is positioned proximate to the plurality of ropes 54. The pulse repetition frequency is high (approximately 2 mHz) such that the targets 52 may be distinguished from the rope 54 and any irregularities in the spacing between targets 52 may be determined. In addition, the pulsed radar emitted by the monitoring device 56 may be focused at a various predetermined distances. As a result, a plurality of ropes 54 may be monitored simultaneously using a single monitoring device 56.

Although the invention has been shown and described with respect to exemplary embodiments thereof, it should be understood by those skilled in the art that various changes, omissions, and additions may be made thereto, without departing from the spirit and scope of the invention.

What is claimed is:

1. An elevator hoisting rope including a plurality of discrete targets permanently fixed within the hoisting rope, the targets being spaced along the length of the hoisting rope, the targets having a characteristic that may be monitored by a device responsive to that characteristic, such that changes in spacing between targets may be determined, and wherein such changes in spacing between targets is indicative of degradation in the hoisting rope such that an elongation in the elevator rope may indicate that maintenance or replacement of the rope is necessary.

2. The hoisting rope according to claim 1, the hoisting rope being formed from a plurality of load-carrying strands, and further including a non-load-carrying tube disposed within the plurality of strands such that elongation of the plurality of strands produces a corresponding elongation of the tube, the tube having a modulus of elasticity less than the load-carrying strands of the hoisting rope, and wherein the targets are secured to the tube.

3. The hoisting rope according to claim 2, wherein the tube is woven into the plurality of strands of the hoisting rope.

4. The hoisting rope according to claim 1, wherein the targets are formed from a material having as a characteristic the ability to reflect electromagnetic energy, such that a device emitting such electromagnetic energy may be used to determine the spacing between targets.

5. The hoisting rope according to claim 1, wherein the targets are formed from a material having a magnetic permeability characteristic that may be monitored to determine spacing between targets.

6. The hoisting rope according to claim 5, wherein the targets are dimensioned such that when electromagnetic energy of a particular frequency is directed onto the target, a reflected beam is generated laterally relative to the longitudinal direction of the hoisting rope.

7. The hoisting rope according to claim 6, wherein the targets have an oblate spheroid shape.

8. The hoisting rope according to claim 6, wherein the targets have a hyperbolic conical shape.

9. A method to monitor the degradation of an elevator hoisting rope, the hoisting rope including a plurality of discrete targets permanently fixed within the hoisting rope, the targets being spaced along the length of the hoisting rope, the method including the steps of:

positioning a device proximate to the hoisting rope, the device being responsive to a characteristic of the target and positioned to sense the presence of a target;

moving the hoisting rope relative to the device; and monitoring the targets to determine the spacing between targets and thereby determine the elongation of the hoisting rope.

10. The method according to claim 9, wherein the targets are formed from a material having a magnetic permeability characteristic, wherein the device is responsive to changes in magnetic field, and wherein the step of monitoring the targets includes determining the location of each target by sensing the presence of changes in the magnetic field generated by the target.

11. The method according to claim 9, wherein the targets are formed from a material having as a characteristic the ability to reflect electromagnetic energy, wherein the device is responsive to electromagnetic energy, and wherein the method further includes the step of impinging electromagnetic energy onto the targets, and wherein the step of monitoring the targets includes determining the location of each target by sensing the presence of the reflected electromagnetic energy.

12. The method according to claim 11, wherein the targets are dimensioned such that when electromagnetic energy of a particular frequency is directed onto the target, a reflected beam is generated laterally relative to the longitudinal direction of the hoisting rope, and wherein the step of monitoring the targets includes determining the location of each target by sensing the presence of the reflected beam.

* * * * *